United States Patent
Crespo et al.

(10) Patent No.: US 6,854,112 B2
(45) Date of Patent: Feb. 8, 2005

(54) SYSTEM AND METHOD FOR THE AUTOMATIC INSTALLATION AND CONFIGURATION OF AN OPERATING SYSTEM

(75) Inventors: Alejandro Agudo Crespo, Madrid (ES); Ignacio Fernandez Gonzalez, Madrid (ES)

(73) Assignee: International Business Machines Corporation, Armonk, NY (US)

(*) Notice: Subject to any disclaimer, the term of this patent is extended or adjusted under 35 U.S.C. 154(b) by 456 days.

(21) Appl. No.: 09/942,134

(22) Filed: Aug. 29, 2001

(65) Prior Publication Data
US 2003/0046682 A1 Mar. 6, 2003

(51) Int. Cl.⁷ .............................................. G06F 9/445
(52) U.S. Cl. ........................ 717/174; 717/175; 717/176; 717/177; 717/178; 709/203; 709/204; 707/203
(58) Field of Search ................................. 717/169–178; 709/203–204, 229; 707/203; 710/36

(56) References Cited

U.S. PATENT DOCUMENTS

| | | | | |
|---|---|---|---|---|
| 5,566,339 A | * | 10/1996 | Perholtz et al. | 713/340 |
| 5,758,165 A | * | 5/1998 | Shuff | 717/178 |
| 5,909,581 A | | 6/1999 | Park | 717/170 |
| 5,923,885 A | * | 7/1999 | Johnson et al. | 717/176 |
| 5,960,204 A | | 9/1999 | Yinger et al. | 717/176 |
| 6,006,034 A | * | 12/1999 | Heath et al. | 717/170 |
| 6,151,643 A | * | 11/2000 | Cheng et al. | 710/36 |
| 6,202,206 B1 | * | 3/2001 | Dean et al. | 717/177 |
| 6,298,480 B1 | * | 10/2001 | Beuk et al. | 717/171 |
| 6,338,149 B1 | * | 1/2002 | Ciccone et al. | 714/38 |
| 6,360,366 B1 | * | 3/2002 | Heath et al. | 717/178 |
| 6,457,076 B1 | * | 9/2002 | Cheng et al. | 710/36 |
| 6,499,137 B1 | * | 12/2002 | Hunt | 717/164 |
| 6,571,389 B1 | * | 5/2003 | Spyker et al. | 717/176 |

FOREIGN PATENT DOCUMENTS

| | | | |
|---|---|---|---|
| EP | 0811942 | 12/1997 | G06F/17/60 |
| WO | WO97/19395 | 5/1997 | G06F/1/00 |

OTHER PUBLICATIONS

TITLE: Introducing Client/Server Technologies in Information Systems Curricula, author: Chaudhury et al, ACM, 1997.*
Copy of International Search Report for PCT/EP02/09681.

* cited by examiner

*Primary Examiner*—Chameli C. Das
(74) *Attorney, Agent, or Firm*—John R. Pivnichny; Myers Bigel Sibley & Sajovec

(57) ABSTRACT

A system and a method for installing and configurating a package including an operating system, software products, and applications on end-user computers connected to server computers in a network. The method is based on a pull deployment model where installation is triggered and performed on site by the end-user, using tools provided by an administrator. Based on a predefined machine function, a generation process generates a source file having required parameters to make the installation, those parameters being stored in a centralized configuration database. Response files needed for the installation are generated in turn. The system allows tracking the installation process and reporting its success or failure to the central database.

23 Claims, 11 Drawing Sheets

SYSTEM AND METHOD FOR THE AUTOMATIC INSTALLATION AND CONFIGURATION OF AN OPERATING SYSTEM

FIELD OF THE INVENTION

The present invention relates to software installation and configuration, and particularly to a system and a method for the pristine, unattended installation and configuration of operating systems.

BACKGROUND

Enterprise Operations require operating systems, products, and software applications to be automatically built. It is critical for all the systems in the enterprise to be at the same operating system level and for each individual configuration type to be at the same product code level for proper functionality.

Pristine installation, a part of the wide enterprise deployment process, is a well-known process in which system administrators add, in an unattended installation mode, new servers and new workstations to the network that do not have an operating system or software installed on them.

Unattended or pristine installation is key to reducing the Total Cost of Ownership (TCO) factor. As managing systems becomes increasingly complex, pristine installation deployment methods become key to businesses or enterprises that try to minimize disruptions of Information Technology (IT) services. Other organizations must cope with the pressure of Service Level Agreements (SLA) which impose specific conditions and penalties for operation disruptions. For these organizations the time of resolution of incidents must be dramatically reduced.

Today, by using response files on small Local Area Networks, technicians are able to run unattended installation setups from individual computers. On these installations, response files provide the options required to install the operating system, which otherwise would need to be entered manually. Control of the installation is carried out by the technician who launches the process. But IT requirements of users are changing in today's marketplace at a very fast pace. These changes drive the continuous innovations and efforts that are being put into the development of tools better able to meet new business requirements.

So far, different systems and methods to load operating systems that are platform dependent have been applied to the attended or unattended installation of servers and workstations. In the marketplace, products like those from Installshield Corp., Wise Corp., Tivoli Systems Inc Corp., IBM Corp. and Microsoft Corp. are the most widely used to install commercially available operating systems such as Microsoft's Windows NT, OS/2 from International Business Machines Corporation, Microsoft's Windows 95, as well as UNIX or AIX operating systems. While providing efficient methods to perform unattended installation, these products either provide installation for only some operating systems, or fail to provide central control of the process or command line exits that enable the generation of the unattended installation parameters.

Thus, a common drawback of existing systems is that they do not provide for an interface between the unattended installation of the operating system and the desired configuration of the machine to be built. The result is that the end user must be sufficiently skilled to be able to perform the unattended installation himself. Additionally, each time a new machine is to be built, all the parameters must be re-entered.

U.S. Pat. No. 6,202,206 to Dean et al., provides a method for installing programs, settings and configurations in a network of a plurality of server and client computers. The method involves the steps of preloading all the programs to be installed into a primary server and running a sequence of keystrokes and cursor entries to install the selected components and programs. This solution requires that the user be sufficiently skilled to select the components and programs to be installed.

However, all known attempts to solve these problems lack a user interface that provides a system for monitoring and controlling the software being loaded, and checks which products were successfully installed and configured.

Moreover, nothing presently known provides a command line and a central configuration database that allows a deployment team to automate and control the installation and configuration to of additional products once the operating system has been properly loaded.

Finally, nothing presently known provides a profiling mechanism that minimizes the user input needed to properly load the operating system.

Therefore, there is a need for a new system and a method to perform the unattended installation of servers or workstations based on a set of profiles. There is also a need for a new method of deployment that keeps track of the whole life cycle of the servers or workstations, isolating the end users from the intricacies of product installation and configuration.

SUMMARY OF THE INVENTION

It is therefore an object of the present invention to improve current systems and methods for the pristine installation of operating systems.

It is another object of the present invention to build the operating system and any required product or application according to a machine profiling mechanism controlled by a central repository.

It is a further object of the present invention to provide a solution integrated with software distribution products in order to automatically update machines after the are first built.

It is yet a further object of the invention to provide a solution that allows tracking of the status of servers or workstations over their life cycles.

Another object of the invention is to provide a solution that isolates the end-user from implementation details, such as the operating system parameters (the default routers, the video drivers, and so on) or from the products configurations.

Yet another object of the invention is to provide a system that is portable to other operating systems or databases.

The present invention provides a method to control the pristine installation of software on servers or workstations. The method is based on a pull deployment model, where the installation is triggered and performed on-site by the end-user, using tools provided by an administrator. Based on a predefined machine function, the invention provides a generation process that generates a source file having all the parameters required for the installation. The parameters are stored in a centralized configuration database. Response files needed for the pristine installation of any workstation or server of a network are generated in turn. The disclosed system allows tracking of the installation process and reporting its success or failure to the central database.

Moreover, the invention provides standard support(floppy disk, cdrom, optical cdrom or any other storage device) to boot a target machine to launch the initial load of the machine based on an assigned function. This support basically pulls the installation files from a server and then installs the required operating system, the specific configuration, and all other products or applications associated with the respective machine.

The role of a system administrator is to automate the installation of the operating system and products for each specific function; consequently, the application of the invention is not limited by any hardware or software specific characteristic.

The disclosed method controls the pristine installation of operating systems and products, with the advantages of:

providing centralized control of deployment;

tracking the inventory of machines and associated hardware and software;

isolating a user from installation, configuration, and implementation details of the hardware and software;

avoiding the need for connection to a central repository to build machines;

avoiding the need for special skills to install servers or workstations;

assuring that base levels of machines are fulfilled;

saving deployment costs and reducing deployment time;

enabling a centralized build-up of all machines for a particular site at any location or a local build-up of individual machines one site, if needed;

allowing the machines to be rebuilt any number of times;

integrating the pristine installation and the software distribution under a unique control system;

allowing the method to be ported to different operating systems and databases; and enforcing the fulfillment of naming standards.

The present invention achieves the foregoing and other objects by providing a method for installing and configurating a package including an operating system, software products, and applications on one or more end-user computers connected to one or more server computers in a network. The method comprises the steps of:

storing into a central repository the package and identification data of one or more end-user computers;

sending the package from the central repository to one or more server computers based on the identification data;

creating on the server computers installation programs and associated response files based on the identification data; and installing the package on the end-user computers.

The identification data includes at least location information regarding where the end-user computers are installed, and information on the functions that the end-user computers perform in the network.

BRIEF DESCRIPTION OF THE DRAWINGS

The invention itself, as well as a preferred mode of use, further objects and advantages thereof, will best be understood by reference to the following detailed description of an illustrative detailed embodiment when read in conjunction with the accompanying drawings, wherein.

DETAILED DESCRIPTION OF THE PREFERRED EMBODIMENT

The present invention is described for use in pristine installation on servers or workstations. However, the description is illustrative rather than limiting, and, once taught the present invention, those skilled in the art may extend its use to other environments.

In the following description, some terms are used in a generic sense well-known by those skilled in the art to designate several types of components. For example, the terms server, workstation, and machine are used with respect to any hardware of computer system.

A fundamental observation has led to the invention: on IT installations, the staff (the Architecture Group) that requests the installation of products with a particular configuration is different from the staff (the Production Group) that realizes the implementation. The only link between the Architecture group, the Production group, and the end-users is a 'by-function' definition of the hardware, the operating system, and the products or the applications required for the particular configuration.

So, before describing the invention with reference to the figures, some general concepts of the invention, including the by-function one, are first explained:

Function: the role or the profile that a machine will perform once it is properly built with the required operating system, products, and applications. For example, a function could be 'SAP client' or 'microsoft office workstation' or 'internet browser'.

Function Class: a function class identifies a group of identical functions.

Function Class Code: a Function Class Code identifies the functional group the machine belongs to. In the preferred embodiment, the Function Class Code corresponds to a given operating system plus the general purpose role of the machine. For example 'MS Windows NT SAP Server' or 'MS Windows NT SAP Client' designate respectively SAP Server hardware and SAP Client hardware that operate on the Windows NT operating system.

Machine name: a unique name assigned to one machine within a networked environment. The method described hereinafter uses a standard naming convention for every machine to be built (a target machine). The name contains codes for designating a site/location where the machine is installed, codes for designating a Function of the machine, and a number associated with the respective machine. For the sake of illustration, the following naming convention is assumed for the entire description. Preferably, the name of a machine is made of seven Characters 'VVVffnn', where: the first three characters 'VVV' of a machine Name identify the site or location; the next two hexadecimal characters 'ff' identify the Function Code; and the last two decimal characters 'nn' identify the machine Number that makes the function unique in the respective location or site.

This particular convention is illustrative rather than limiting, and other naming and encoding conventions may be used to build the machine parameters, based on the machine name, such as using translation tables to translate the location or site name to a subnet. For instance, the list below gives some other well-known conventions:

using an IP type Address: '10.vvv.fff.nnn' with a conversion from hexadecimal to decimal;
using a Netbios name: 'VVVPffnn';
using a DB Name: 'VVVBffnn'; or
using a Mac Address: '400000vvffnn' for the first adapter; where VVV, ff and nn may have the meaning described above for the machine naming. It is to be understood that the numbers of characters used for encoding the function codes, the site/location codes, and the machine numbers may vary depending on the specific implementation of the system. Those details are peripheral to the invention, as they depend on different pristine installation scenarios.

Figure 1:
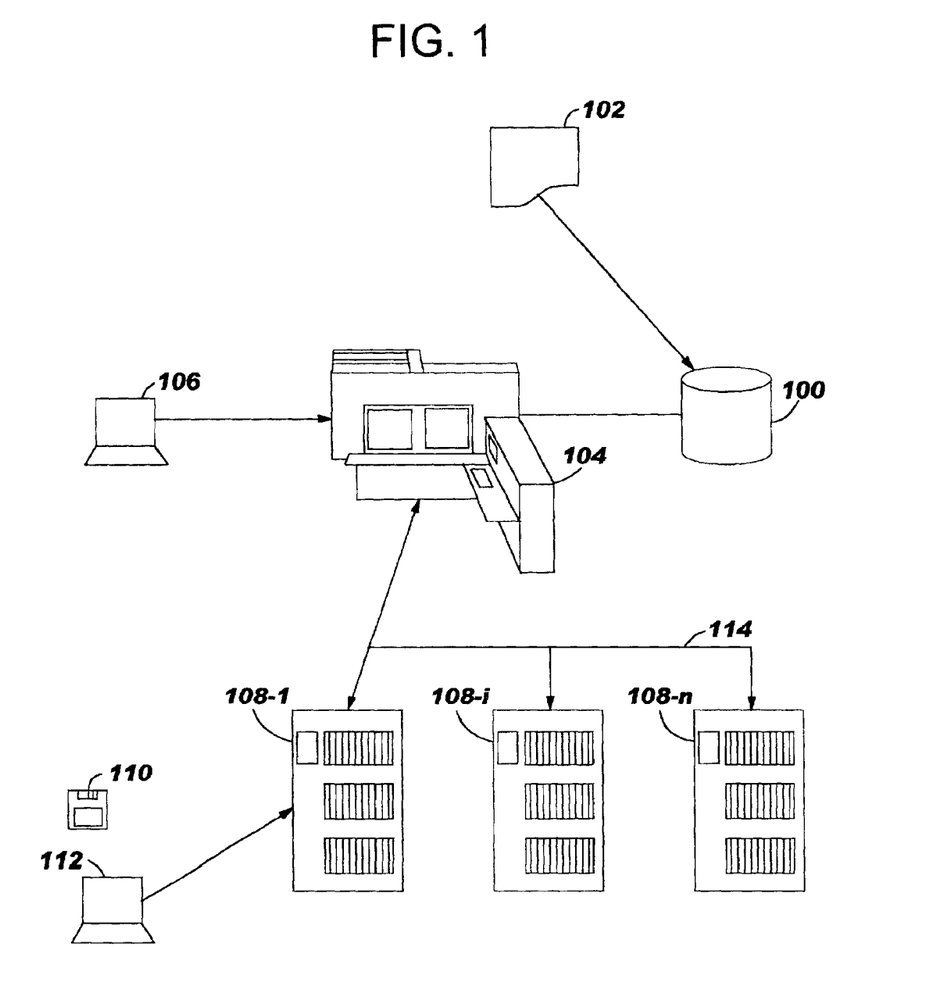
FIG. 1 shows the architecture and main components of the system of the present invention.

Referring now to FIG. 1, the main components of the present invention are described. A Configuration Database (100) which is a storage area of a Central Repository (104) stores identification data (packages, and the definition/configuration/parameters of hardware and software) associated with each target machine 112 (end-user workstation or server) to be installed. The Configuration Database may be a DB2 database implemented on a S/390 mainframe, where both products are from the IBM Corporation.

A Software Distribution Application, hereinafter named 'SD Application' (102), is used as a front-end of the Configuration Database 100 to manage the different operations performed during the unattended installation. A plurality of Software Distribution servers, hereinafter named 'SD Server' (108-1, 108-i, 108-n) are connected to the Central Repository (104) to receive the Packages and all necessary files (such as operating system files) generated during the preparation of the unattended installation of the target machines (112). A Software Distribution Packaging component connected to the Central Repository and hereinafter named 'SD Pack' (106) creates the Packages, which are next uploaded to the Central Repository 104. A Boot Diskette (110) may be used on the target machine (112) to launch the required system.

For sake of clarity, the system is detailed for one SD server (108) and one target machine (112), which is an end-user terminal.

The Configuration Database (100) stores the definitions of the hardware and the software devices, their configurations, and their parameters. The configuration database (100) maintains a set of data structures, preferably in the form of tables which contain:

the different codes used in an application (the Location, the machine status, the delivery status, the function name, etc.);
the class of a function (an Application, a Database, the Internet, Servers, Networking, etc.);
the parameters of a function (the base Operating System, the protocol, the products, etc.);
the packages required for a function and their installation rules (manual/automatic, initial/update, destination, etc.);
the hardware needed for a function;
the hardware Class (a Keyboard, a Video Monitor, a Network Adapter);
the definitions of the packages and their delivery status (Upload, Download, Error, Available, Sent);
the definitions of the hardware and their inventory status; and
the definitions of all machines, their parameters, their hardware, their packages, and links between machines.

It is to be noted that the Configuration Database (100) further keeps track of the status of the SD Server (108) and of the System Packages once downloaded.

The SD Application (102), as previously mentioned, performs several operations, and particularly: manages different configurations for the target machines based on their functions; manages and keeps track of parameters associated with the machines; tracks the machines during their life cycles (Generated, Transition, Installed, etc.); triggers the processes to load and configure a machine; manages system and application software with their distribution status (Upload, Download, Error, Available, Sent); and, finally, manages the delivery of Packages to the SD server (108).

The SD Pack (106) is also used to update the respective tables of the Configuration Database (100) once a package is uploaded into the Central Repository.

In addition to operating system files, the SD Server (108) also stores installation scripts for video, network adapter drivers, and unattended products, which are to be executed by the target server or workstation. The SD Server (108) has the capability to query the Central Repository (104) during a replication process and to download the respective System Package defined by the same location and function, as will be detailed later.

An end-user boots the target machine to be built by launching a MS-DOS application or a CID compliant application (i.e. a Configuration-Installation-Distribution method for an OS/2 launch) that prompts the user to enter the target machine name, the SD Server name, the hardware model, and the network adapter type. After that, the operating system and associated packages previously linked to the function are installed automatically.

The invention includes several processes, which are now described with reference to the accompanying drawings.

Package Management Process

Figure 2:
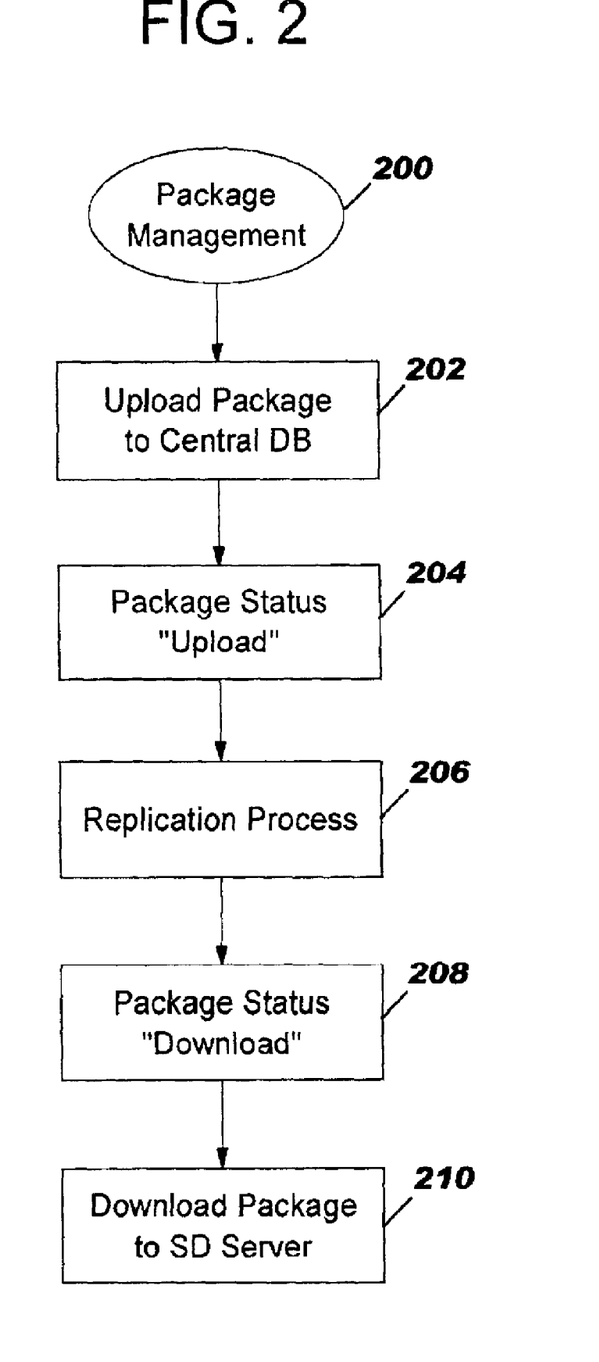
FIG. 2 is a flow chart of the Package management process of the present invention.

FIG. 2 shows a Package Management process 200 that is performed through the SD Pack (106). On first operation (step 202) packages previously created by any conventional packaging method that associates a package name and version with the package are uploaded to the Central Repository (104) from the SD Pack (106). Next (step 204), each upload operation updates a package status in the Configuration Database 100 by setting the package status to 'Upload'. The SD Servers (108-1, 108-i, 108-n) that receive the respective packages run a replication process to query for packages (step 206). The replication process further allows the SD servers 108 to synchronize with the Configuration Database 100 when they are remote. The package status is then updated to 'Download' (step 208), and the packages are downloaded to the corresponding SD Servers (108-1, 108-i, 108-n) (step 210). The SD servers (108) may be located in different remote sites, such as in a PC factory (a central site where machines are built and inventoried before deployment) or in any location where machines need to be loaded.

Workstation Definition Process

The Workstation Definition process performed by the SD Application (102) primarily manages the configurations of the devices on the network. A workstation generation process is first run on the SD Servers (108) using the location and function information pertinent to a machine. This information, which is stored in the Configuration Database (100), is fetched by the SD Application (102) when the end-user enters the machine name. The workstation generation process sends the personal information of the target machine (112) from the Configuration Database (100) to the SD Server (108), and triggers a process to create an installation program on the SD Servers (108) and the corresponding response files needed for each machine.

The installation program residing on the SD Servers (108) defines the installation steps to install the operating system, all the baseline products and applications for the respective function, and additional packages that may be available. The installation program may stop in case of errors, and may recover at the interrupted step once the problem that caused the error has been fixed.

Initial Load Process

In a preferred embodiment, the Initial Load process for loading a target machine is operated by using a floppy disk as a boot diskette. The initial load of a target machine (112) (for example, a server or a workstation) is done via a connection to the SD Server (108). The target machine (112) connects to the SD server (108) using the boot diskette. If the initial load is done in a PC factory, the target machine is connected to its subnet of the network after the successful load. Then, the SD Server (108) updates the status of the target machine (112) in the Configuration Database (100) to a status that indicates that the machine has been correctly loaded.

A more detailed description of the operations performed by each component of the system of the invention follows.

A. Operations Performed by SD Application

The SD Application (102) provides a set of definitions that are required to manage the workstations to be built, and a set of actions associated with each definition. Preferably, this set of actions includes the following actions: to list, to create, to delete and/or to modify each definition.

Figure 3:
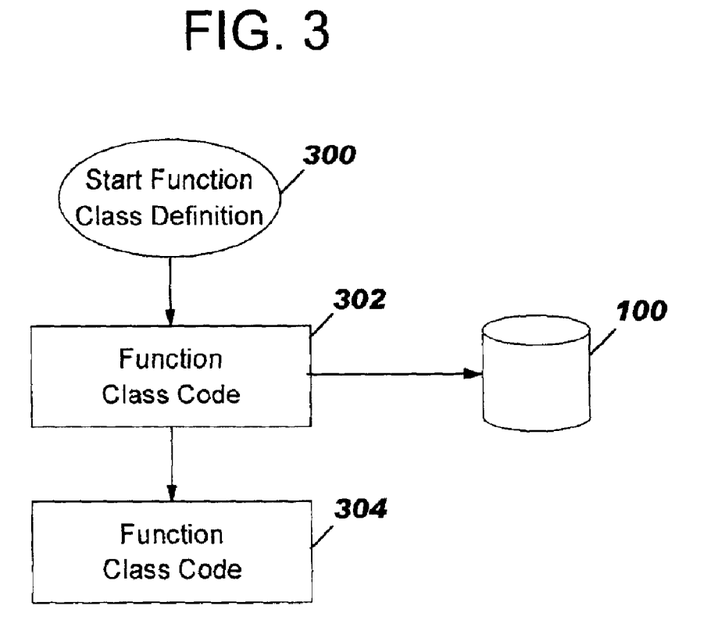
FIG. 3 is a flow chart of the definition of a Class Function according to the method of the invention.

Each workstation to be installed is defined by a set of items that identify the workstation uniquely within the network. The items defined are preferably:

Function Class: a Function Class includes a 'Function Class Code' that uniquely identifies the Function Class and a 'Function Class Code Description'. FIG. 3 illustrates the process 300 to generate a Function Class Definition as performed by the SD Application (102). A Function Class Code is generated and is stored in the Configuration Database (100) (step 302). Then, a Function Class Code Description is assigned to the Function Class Code (step 304).

Every Function Class definition may be created, listed, deleted, and modified. A create action allows insertion of the Function Class Code and the Function Class Code Description into the Configuration Database (100). A delete action deletes the Code and the Description—as well as any instance of the depending functions and workstations—from the Configuration Database 100. A modify action updates the Description of any Function Class Code in the Configuration Database (100), and a list action performs a select of the Function Class Codes and the associated Descriptions.

Function: a Function defines the role a machine will perform, and is uniquely identified by a 'Function Code' and a 'Function Description'. Each definition of a Function specifies an Operating System, a description, a set of parameters to indicate specific settings of the operating system (for instance, the Domain Server, the Print Server, the Specific Hardware), and other parameters that may be required to specify which middleware product should be loaded.

Figure 4:
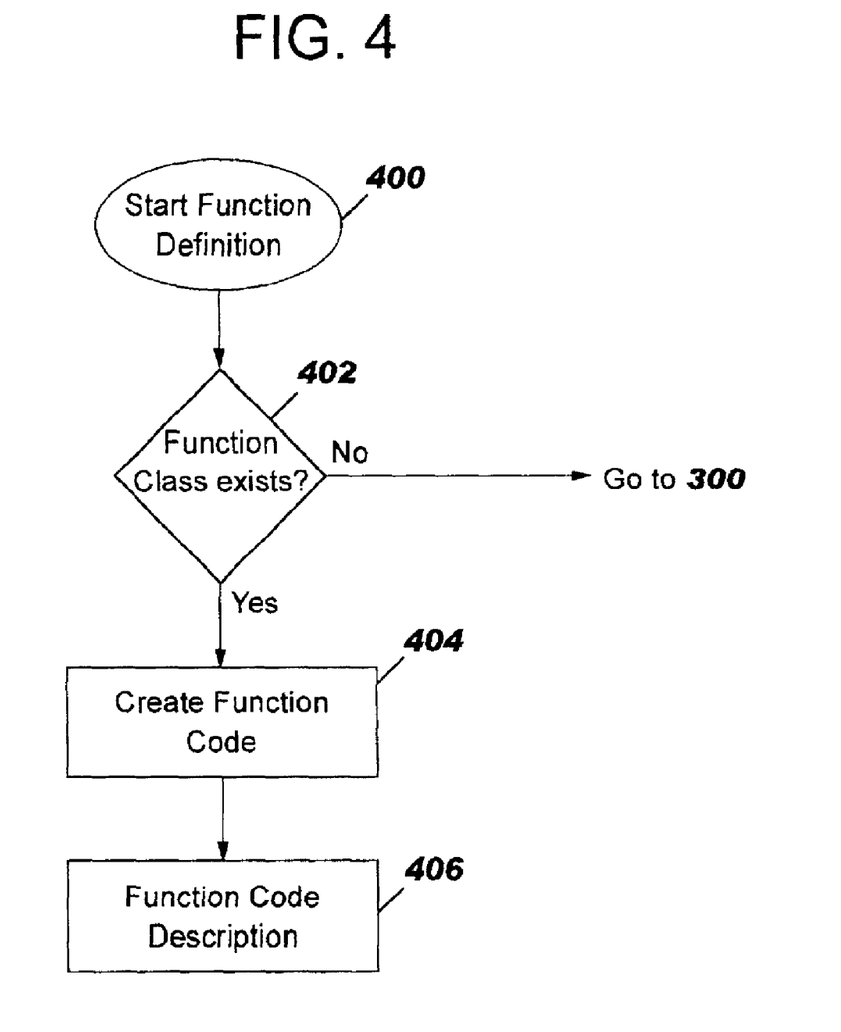
FIG. 4 is a flow chart of the Definition of a Function process according to the method of the invention.

FIG. 4 is a flow chart of the Function Definition process performed by the SD Application (102). As shown in this flow chart, on a first step (step 402) a Function Class is searched. If the Function Class does not exist, (branch NO) then it is created (go to step 300). If a Function Class already exists for the function (branch YES), then a code is created for that specific function (step 404). A function code description is then generated (step 406). Each Function definition may be created, listed, detailed, deleted, and modified, and associated packages may be listed. A create action performs the operations depicted in FIG. 4. A list action performs a select in the Configuration Database (100) to display the function code and description. A Detail action may be performed to display the detailed description of a function. A delete action deletes any instance of the function within the SD Configuration Database (100). A modify action changes the descriptions or parameters of the function and updates them in the SD Configuration Database (100). A List-Associated-Packages action lists the packages that are associated with the function.

Figure 5:
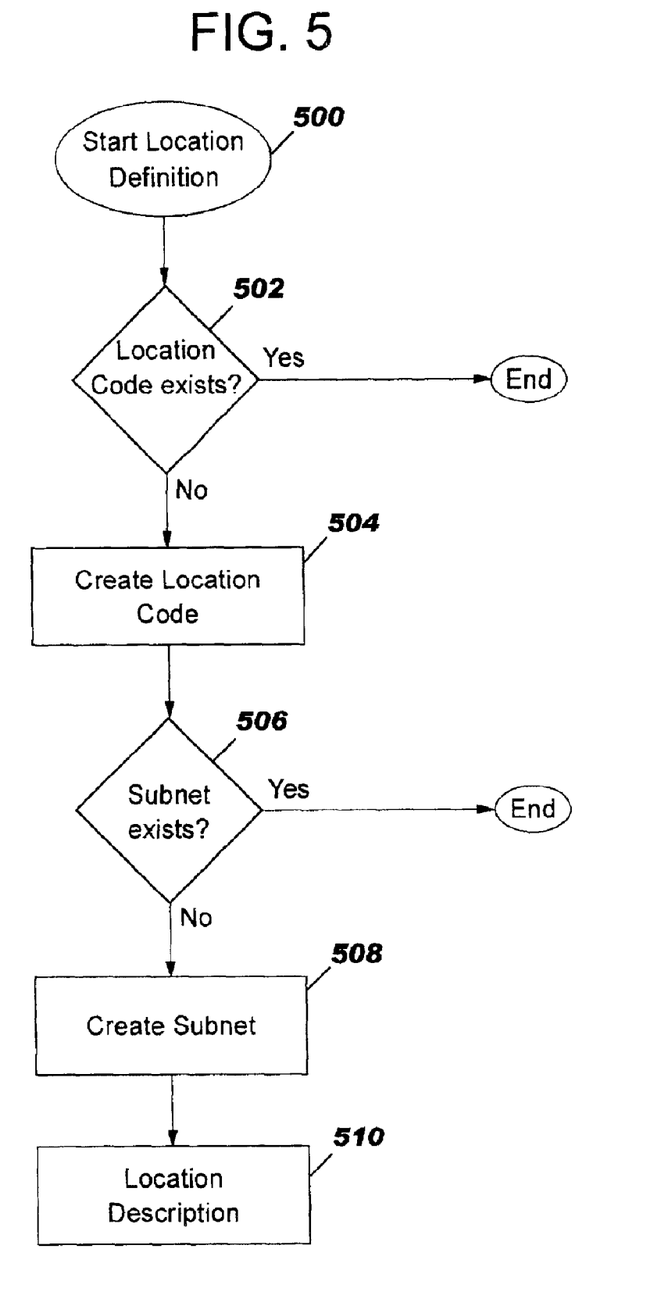
FIG. 5 is a flow chart of the Definition of a Location process according to the method of the invention.

Location: a Location is defined by location data, which includes a 'location code', 'a location code description' and an associated 'subnet' within the network. FIG. 5 shows a flow chart of the Definition process 500 for a Location as performed by the SD Application (102). The process checks if a Location Code already exists (step 502). If so, then the process simply exits. If the Location Code has not yet been created, then a new Location Code is created (step 504).

Next, the process checks whether a subnet exists (step 506). If so (branch YES), then the process simply exits. If the subnet does not exist, the process creates a subnet (step 508). Finally, a Location description is associated with the Location Code (step 510). The Location definition may be handled by the actions already mentioned, i.e. may be created, listed, deleted, and/or modified. The create action performs the operations depicted in FIG. 5. The List action selects in the SD Configuration Database (100) the Location code and the description. The Delete action deletes any instance attached to the Location code within SD Configuration Database (100). The Modify action changes the Location description, updating it in the SD Configuration Database (100).

Figure 6:
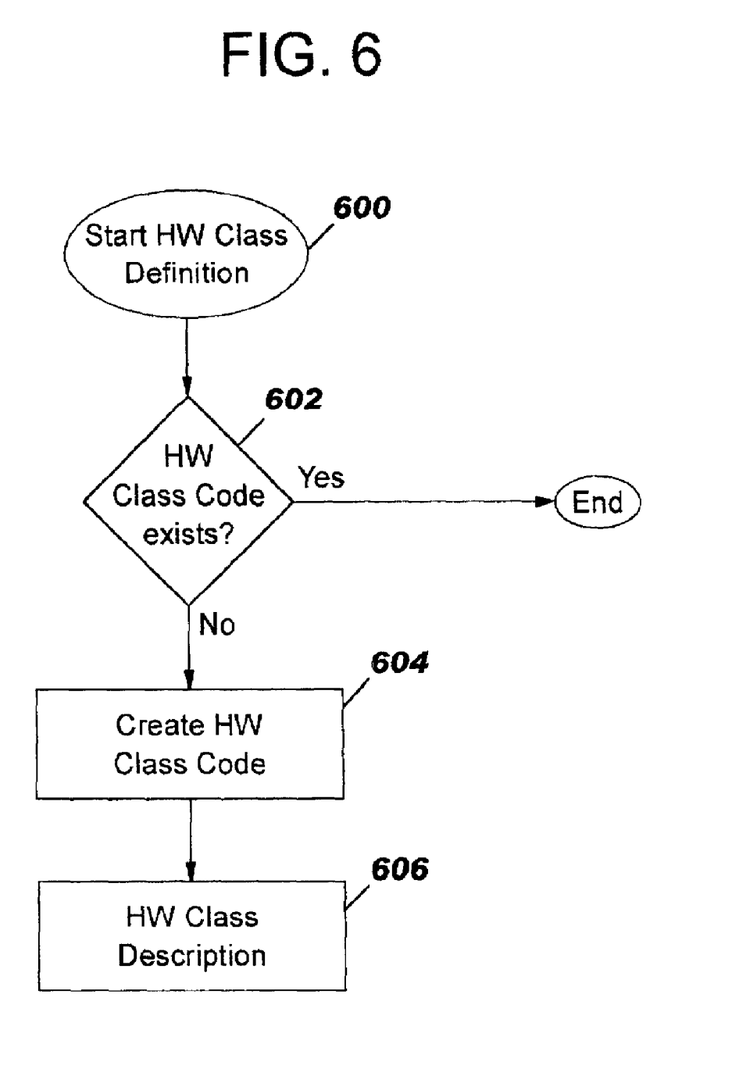
FIG. 6 is a flow chart of the Definition of a Hardware Class according to the method of the invention.

Hardware Class: A Hardware Class includes a 'Hardware Class Code' and a 'Hardware Class Description' that identifies the Class. FIG. 6 illustrates the process 600 for defining a Hardware Class as performed by the SD Application (102). First the SD Application (102) checks whether the Hardware Class Code already exists (step 602). If so, then the process exits; otherwise, the Hardware Class Code is created (step 604) and stored in the SD Configuration Database (100). A Hardware Class Description is then associated with the previously defined Hardware Class Code (step 606). Each definition of a Hardware Class may be created, listed, deleted, and/or modified. A Create action inserts the Code and the description in the Configuration Database (100). A Delete action deletes the code and the description, as well as any instance of the depending Hardware and workstations, from the SD Configuration Database (100). A Modify action modifies the description of any Hardware Class Code, and updates the description record in the SD Configuration Database (100). A List action makes a selection of Hardware Class Codes and associated Descriptions.

Figure 7:
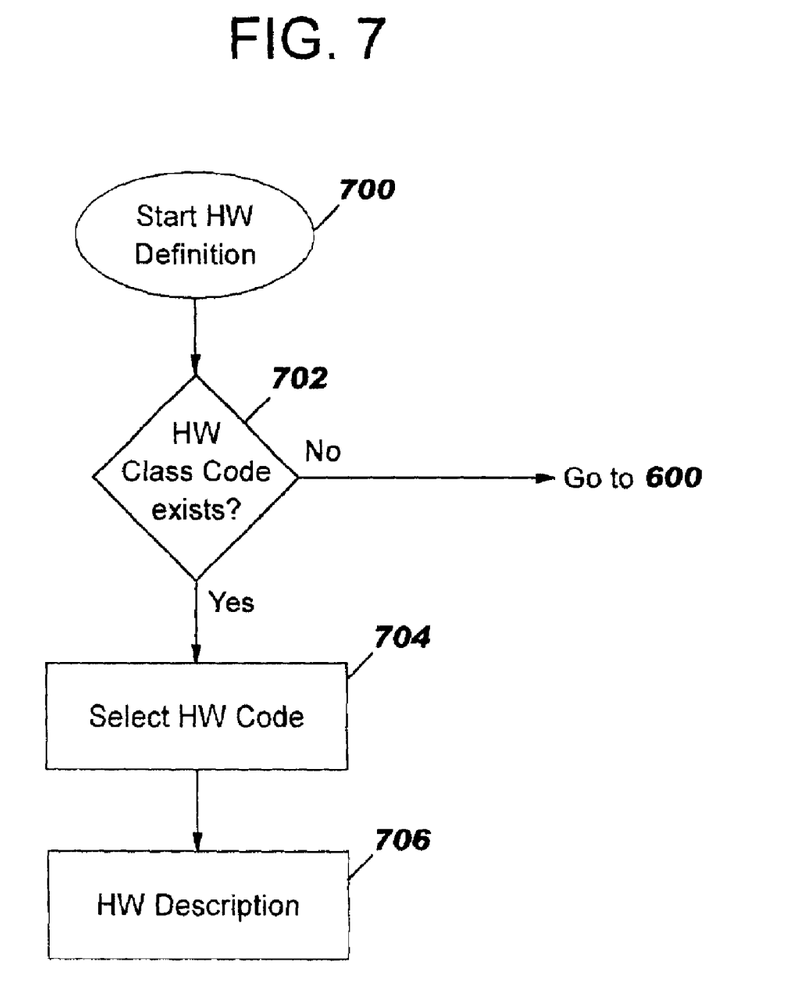
FIG. 7 is a flow chart of the Definition of Hardware according to the method of the invention.

Hardware: A Hardware Definition includes a 'Hardware Code' and a 'Hardware Description' that identifies the respective Hardware. FIG. 7 shows the flow chart of the Hardware Definition process 700 performed by the SD Application (102). The process checks for an existing Hardware Class Code for the specific Hardware (step 702), (Example: the hardware is a Spanish Keyboard to be included in a Keyboard Hardware Class). If the code does not exist, it is created (go to step 600). If the hardware class code exists (branch Yes), a hardware code is created (step 704). A hardware description is then generated (step 706). Each Hardware definition may be created, listed, deleted, and/or modified. A Create action performs the operations as depicted in FIG. 7. A Delete action deletes any instance of Hardware from the SD Configuration Database (100). A Modify action modifies a description record or other parameters of the Hardware description, and updates them in the SD Configuration Database (100). Lastly, a List action makes a selection of Hardware Code, Hardware Class Code, and description in the SD Configuration Database (100).

Figure 8:
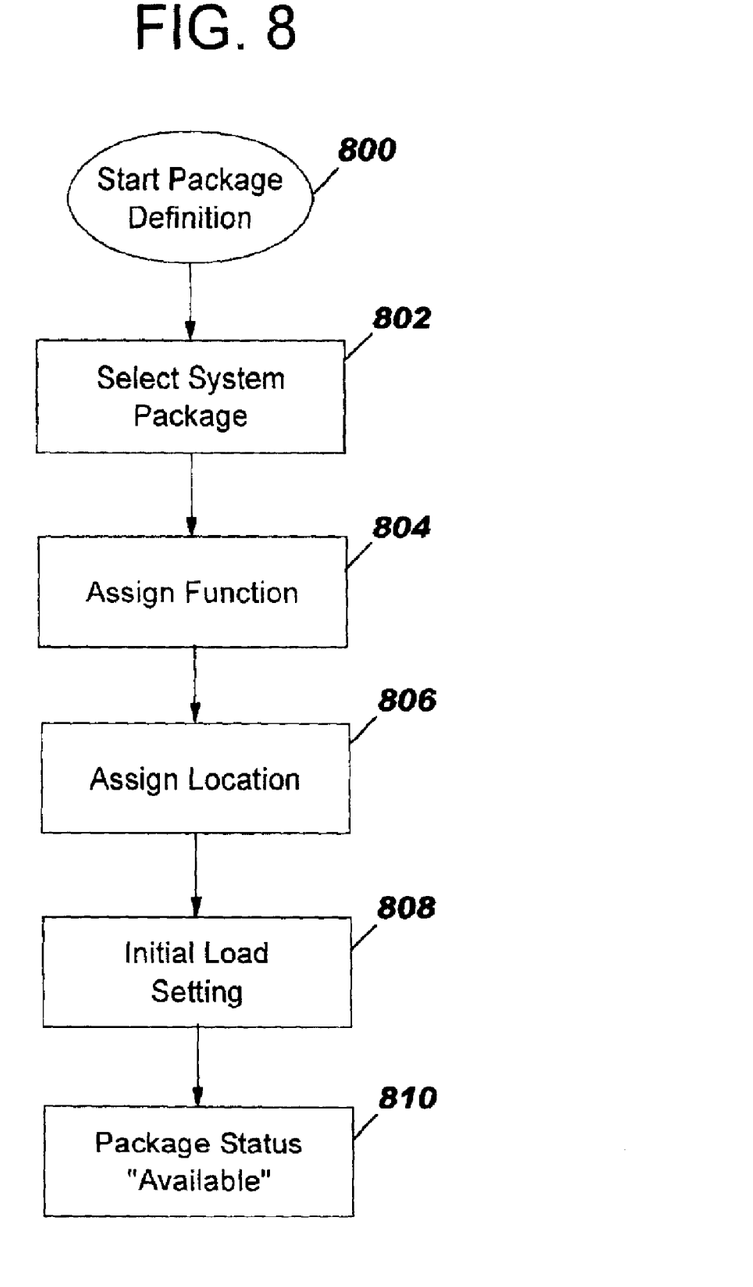
FIG. 8 is a flow chart of the Definition of a Package according to the method of the invention.

Package: FIG. 8 is a flow chart of the Package Definition process 800. A Package Definition includes a 'Package Name' that identifies the Package version, a Package Description, the operating system where the package might be potentially installed, the assigned functions, the assigned locations, the kind of compression, and the file system or directory where the package is physically stored. Packages are created via the SD Pack component (106). The SD Application (102) performs the other actions of listing, modifying, and deleting. First, the System Package is selected (step 802), then a function (step 804) and a location (step 806) are assigned to the Package. Once the location has been assigned, a process sets the package to be loaded in the Initial Load of a machine (808). Then a process is triggered to set the package to status 'Available' for this assigned location (step 810). Any SD Server that belongs to the same location and is defined by the same function, and that queries the Configuration database (100), will download this specific system package.

Figure 9:
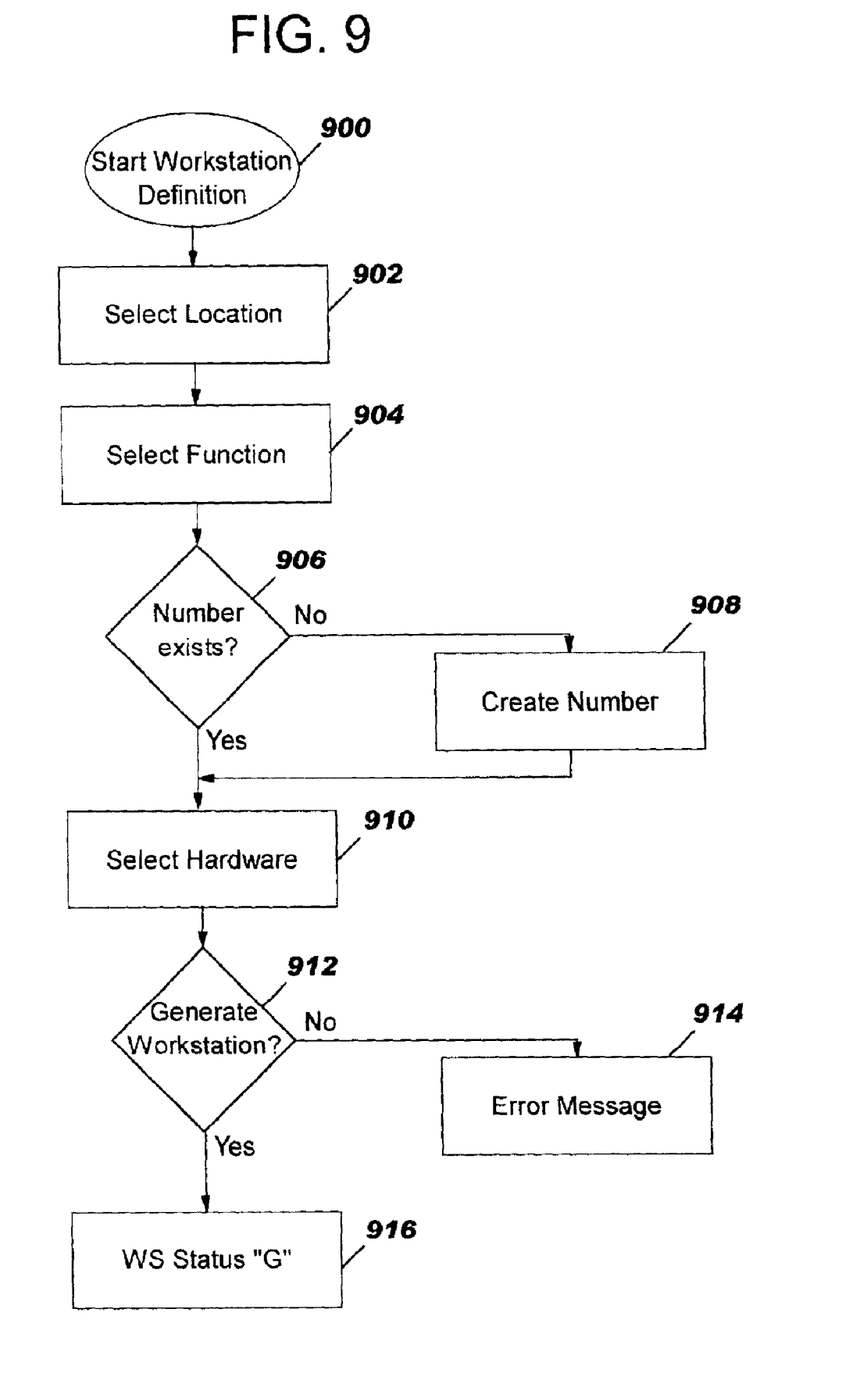
FIG. 9 is a flow chart of the Definition of a Workstation according to the method of the invention.

Workstation: FIG. 9 is a flow chart of the Workstation Definition process (900) performed by the SD Application 102 for a respective target machine 112. A Location is selected from the Location Code and the associated Location description list (step 902). Next, a Function is selected from the Function Code and the associated Function Code description list (step 904). Then a test is performed to check whether a number already exists for the target workstation 112 that makes the workstation unique in its location (step 906). If not, a number is assigned to the machine (step 908). Whether a number is assigned or not, the hardware required for that machine is selected (step 910). Next, a workstation generation process is executed (step (912) within the SD Application (102) to generate a file in the SD Server (108). If the Generation process fails, an error message is displayed (step 914). This file will be denoted here as the 'SRC' file, and will be detailed below with reference to the operation of the SD Server (108). If the workstation generation process succeeds, the status of the workstation is set to 'Generated' (step 916).

B. Operation of the SD Server: The process performed within the SD Server 108 includes two components: a 'SRC' file and a 'SDCONF' process. The 'SRC' file, as previously described, is generated during the workstation generation process, and contains the necessary parameters in a specific format that will fill specific templates (i.e.: the machine name, the network adapter, the Domain, the video adapter, the keyboard, the Default router, etc). The 'SDCONF' is a process that reads the 'SRC' file and generates response files necessary for the unattended loading of the target machine.

The 'SRC' file name is preferably the Machine Name of the respective machine to be loaded (according to the previously explained naming convention, including Location, function and sequence number), and has a file extension of the type '.GEN'. For instance, existence of a file 'AQU1201.GEN' indicates that machine AQU1201 has been defined by the SD Application (102) and has been correctly generated in the specified SD Server. Moreover, the 'SRC' file contains the complete description of the machine to be generated.

Thereafter, the operating system and the application response files needed to complete the installation of the target machine (112) are created. Basically, the 'SDCONF' process includes the execution of a script that is stored on the SD Server (108) and that is remotely-executed by the SD Application (102). This remote procedure reads data from the 'SRC' file, and creates response files and function-specific scripts needed for the full installation of the target machine (112). The response files and function-specific scripts are built by filling response-files templates residing in the SD Server (108) with the appropriate information. These scripts are used for installing additional packages to be included in the pristine installation process, which are assigned in advance by the SD Application (102) to the function of the respective machine.

The parameters in the 'SRC' file have specific meanings for building the script. Most of the parameters come from the definition of the function that the target machine performs, while others are specific to that machine (e.g., hardware, ip address, etc.). Moreover, some parameters are limited to specific operating systems. This logic is implemented in building the script (SDCONF) that will be responsible for parsing and reading the SRC file.

Once all the files are ready in the SD Servers (108) for the complete installation of the target machine (112), the target machine (112) is booted, connected to the server, partitioned, formatted, and then finally installed. Details of this process differ, depending on the operating system to be installed. In fact, OS/2 comes with its own partitioning tool, namely BootManager, included in three CID boot diskettes, while Windows partitioning has to be done with a DOS network bootable diskette.

The installation operation starts by prompting a user to enter the name of the machine to be installed and the name of the SD Server used to generate the machine. Once this information has been entered by the user, the target machine (112) connects to the SD Server, and the process is fully automated without any other user intervention. Since the machine name format is 'VVVFFxx', the 'OFF' code maps the function of the machine to the proper directory path in the SD Servers (108).

Thus the installation includes installation of the operating system (i.e., OS/2, NT, Windows 2000, or Windows 9x), and installation of additional software products such as:

products common to all functions (commonly named baseline products such as Windows NT Service Pack, OS/2 fixes, Internet Browser, Antivirus, etc);

function-specific middleware products such as the IBM DB2 or IBM MQSeries, or Lotus Notes from Lotus Corp.; and function-specific initial load Software Distribution Packages (typically for Application Packages).

Figure 10:
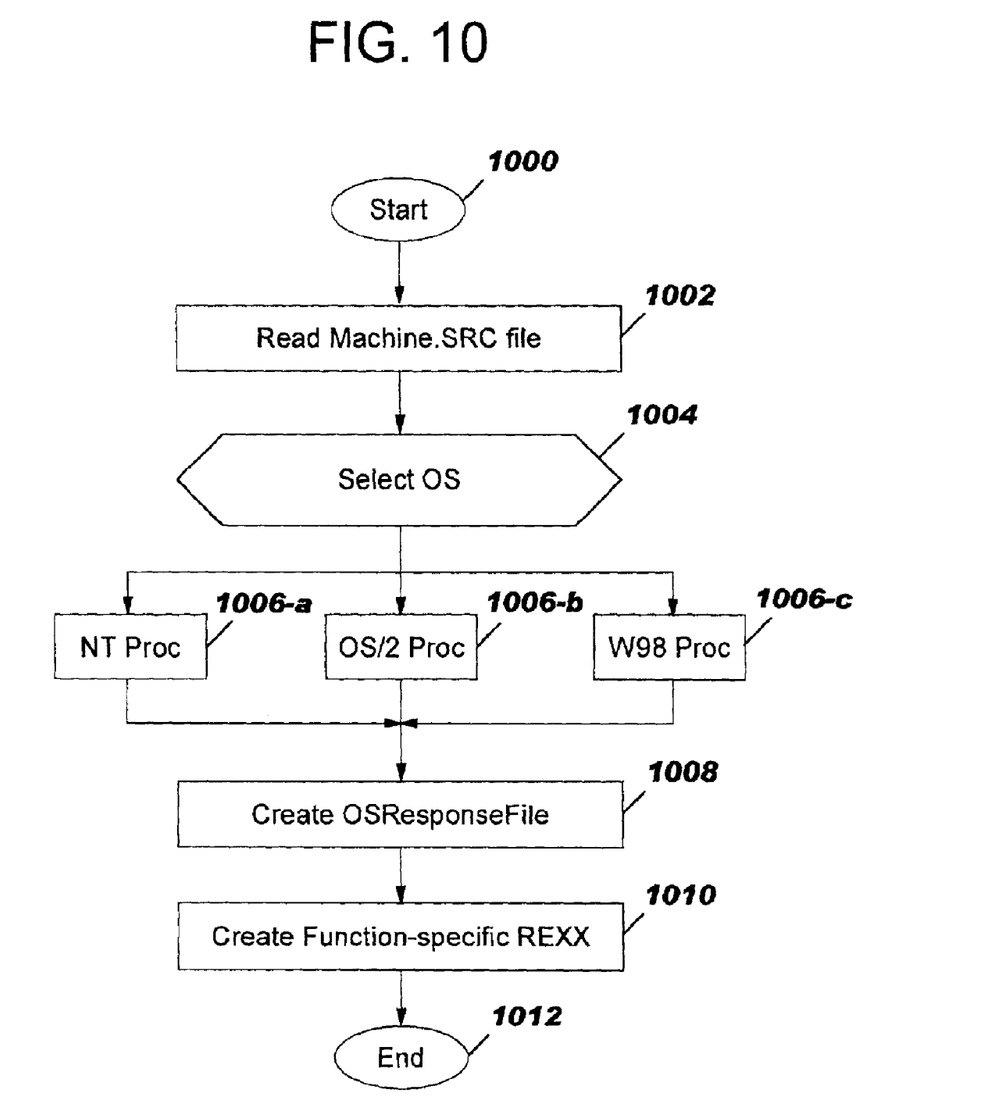
FIG. 10 is a flow chart of the process to generate response files according to the method of the invention.
Figure 11:
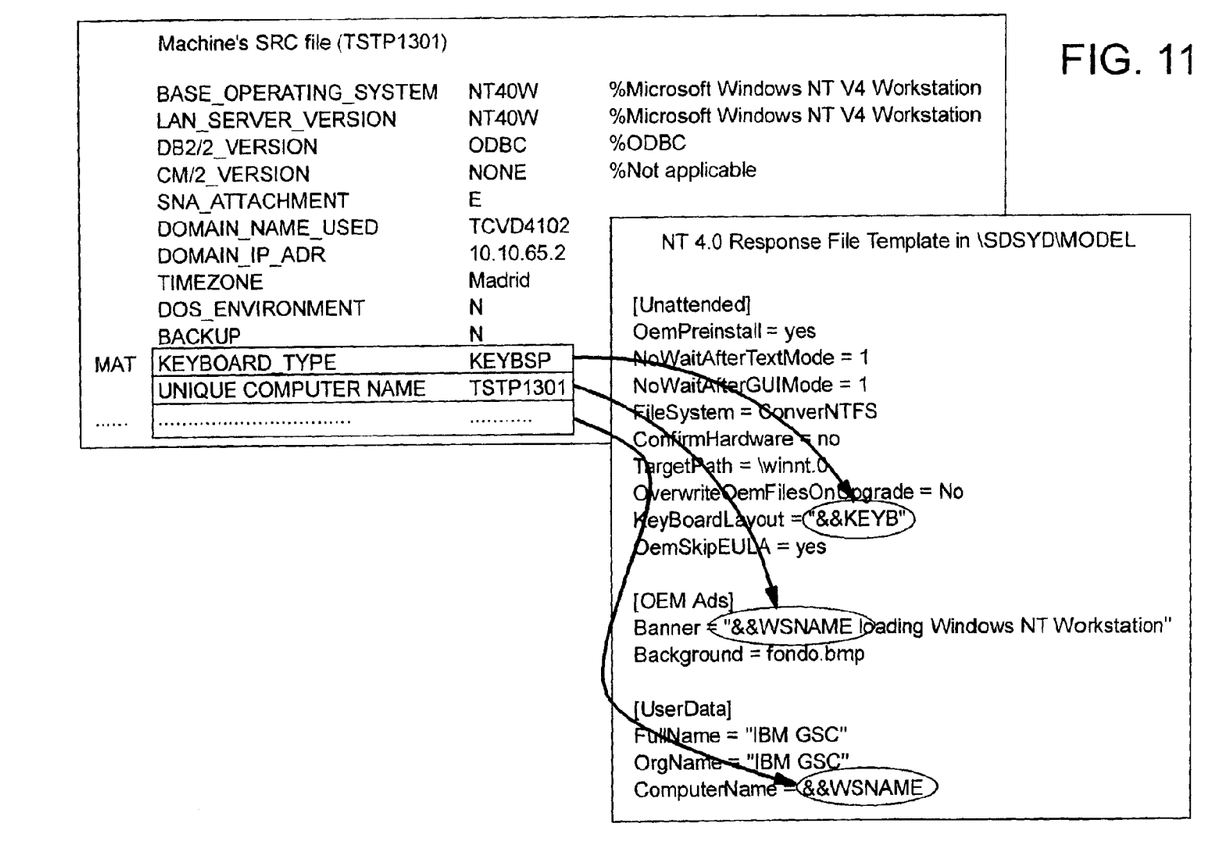
FIG. 11 illustrates the filing of a response file template as performed by the process of FIG. 10.

FIG. 10 illustrates the 'SDCONF' process (1000). First, 'SDCONF' searches for the 'SRC' file associated with the respective machine to be installed, using the name of the Machine to be installed as the search argument (step 1002). The 'SRC' file is then checked to identify the operating system required for the target machine (step 1004). Next, depending on this parameter, a respective sub-routine is called (1006-*a*, step 1006-*b*,1006-*c*). 'SDCONF' builds the operating system response-files by filling the operating system response file template with the specific data read from the SRC file (step 1008). (FIG. 11 illustrates the filing of a response file template for a machine named 'TSTP1301'). Finally, function-specific scripts are created. The function-specific program that installs the middleware products and SD packages may also be used to install machine-specific software such as, for example, hardware dependent software.

Appendix A gives an example of an SRC file that shows the structure of the file with respect to three different types of parameters:

(1) Parameters with no header: for example, the BASE_OPERATING_SYSTEM, or the TCPIP_ADDR, or the FCT_NAME parameters.

(2) Parameters with a 'MAT' header: All of these are hardware parameters, such as the KEYBOARD-TYPE or the SCREEN-TYPE parameters. Specific hardware information regarding the machine to be built is described in this parameter section. Depending on these parameters, the script would include special drivers for the operating system response file.

(3) Parameters with 'SOFT' header: All of these are software parameters, such as the ADMINPWD or the PRINTSRV parameters. The specific software packages that are associated with the machine function are described in this parameter section.

Appendix B illustrates an example of a Directory structure for the SD Servers (108), with the location of the files generated by the 'SDCONF' process. The structures of the two principal elements, CID and SDSYD, are shown. Basically, the CID element stores product installation code and utilities organized by operating system, and the SDSYD element stores function and machine specific sub directories containing the final files that are needed for the complete automated installation of the target machine.

From the above description, it should now be apparent that the invention provides the following additional advantages:

a capability to integrate the Configuration Database (100) with a Software Distribution System;

a capability to extend the concept of 'by-function' to include any number of additional configuration parameters (for instance, to configure a function so an empty client is linked to a specific MQ series product);

a capability to extend workstation definitions with additional fields to store parameters that enable transfer of information to Software Distribution Systems, so that any workstation may be reconfigured, by modifying the parameters in a central database through the SD Application (102);

a capability to send packages between central repositories in order to exchange system packages between different Operation Centres.

While the invention has been particularly shown and described with reference to a preferred embodiment thereof, it will be understood by those skilled in the art that various changes in form and details may be made without departing from the spirit and scope of the invention.

What is claimed:

1. A system for installing and configuring a package including an operating system, software products, and applications on at least one end-user computer connected to at least one server computer in a network, comprising:

means, coupled to the at least one server computer, for storing the package and an identification data of the at least one end-user computer;

means for sending the package from the storing means to the at least one server computer based on the identification data of the at least one end-user computer; and means, coupled to the sending means, for creating on the at least one server computer an installation program and associated response files based on the identification data, to install said package on the at least one end-user computer;

whereby said identification data comprises at least a location data where said at least one end-user computer is installed and a function data associated with the function that said at least one end-user computer performs in the network.

2. The system of claim 1, further comprising means for assigning to said package said at least one end-user computer location data and said at least one end-user computer function data.

3. The system of claim 2, wherein said network further comprises a plurality of end-user computers to be installed with a plurality of packages, and wherein said function data is arranged into a plurality of function classes, wherein each function class identifies a set of end-user computers among the plurality of end-user computers in the network having a common function in the network.

4. The system of claim 3, wherein the plurality of function classes comprises a client function class and a server function class.

5. The system of claim 3, wherein the identification data further comprises information on a hardware configuration and a software configuration of at least some of the plurality of end-user computers in the network.

6. The system of claim 3, further comprising means for updating an installation status of each of the plurality of end-user computers.

7. The system of claim 3, further comprising means for updating a package status of each of the plurality of packages.

8. The system of claim 3, further comprising means for creating the packages and means for sending said created packages to the storing means.

9. The system of claim 1, further comprising means for performing an initial software load on the at least one end-user computer.

10. The system of claim 9, wherein the means for performing the initial software load comprises a bootable device from which the end-user computer boots.

11. A method for installing and configuring a package including an operating system, software products, and applications on at least one end-user computer connected to at least one server computer in a network, comprising storing in a central repository the package and an identification data of the at least one end-user computer;

sending the package from the central repository to the at least one server computer based on the identification data;

creating on the at least one server computer an installation program and associated response files based on the identification data; and installing said package on the at least one end-user computer;

whereby said identification data comprises at least a location where said at least one end-user computer is installed and a function that said at least one end-user computer performs in the network.

12. The method of claim 11, further comprising the step of assigning the identification data to the package.

13. The method of claim 12, wherein said network further comprises a plurality of end-user computers to be installed with a plurality of packages, and wherein the function is selected from a plurality of function classes, each function class identifying a set of end-user computers among the plurality of end-user computers in the network having a common network function.

14. The method of claim 13, wherein the plurality of function classes comprises a client function class and a server function class.

15. The method of claim 13, wherein the identification data further comprises information on a hardware configuration and a software configuration of at least some of the plurality of end-user computers in the network.

16. The method of claim 13, further comprising updating an installation status assigned to each of the plurality of end-user computers.

17. The method of claim 16, further comprising updating a package status assigned to each of the plurality of packages.

18. The method of claim 11, further comprising creating the packages and sending the created packages to the central repository.

19. The method of claim 11, further comprising performing an initial software load of the at least one end-user computer.

20. A system for automatically loading a software package on an end-user computer in a network, comprising:

a central repository that stores a location and a function associated with the end-user computer and that further stores a package that includes an operating system, software products and at least one additional software application;

a server computer coupled to the central repository that is configured to send the package to the end-user computer based on the location and the function; and an application is configured to create on the at least one server computer, an installation program and associated response files based on the identification data, to install said package on the end-user computer.

21. The system of claim 20, wherein the end-user computer comprises a new computer that does not include an installed operating system.

22. The system of claim 20, wherein the server computer selects the package that is to be sent to the end-user computer based on the location and the function associated with the end-user computer.

23. The system of claim 20, further comprising software that is configured to track the installation status of the end-user computer.

* * * * *